(12) United States Patent
Lysen

(10) Patent No.: US 7,646,554 B2
(45) Date of Patent: Jan. 12, 2010

(54) OPTICAL ELEMENT FOR IMPROVING LASER BEAM POSITION

(75) Inventor: Heinrich Lysen, Garching (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 329 days.

(21) Appl. No.: 11/682,002

(22) Filed: Mar. 5, 2007

(65) Prior Publication Data

US 2008/0218884 A1  Sep. 11, 2008

(51) Int. Cl.
*G02B 5/04* (2006.01)
(52) U.S. Cl. .................................................. 359/836
(58) Field of Classification Search .................. 359/836
See application file for complete search history.

(56) References Cited

U.S. PATENT DOCUMENTS 3,785,714 A * 1/1974 Hock et al. .................. 359/373
5,671,004 A * 9/1997 Morizumi ..................... 347/259
6,160,616 A * 12/2000 Ohtomo et al. .............. 356/247
6,253,457 B1   7/2001 Ohtomo et al.
2005/0174467 A1 * 8/2005 Kawai ......................... 348/335

OTHER PUBLICATIONS

Optical Society of America—Bass, Michael, Editor; Handbook of Optics, vol. I—Fundamentals, Techniques and Design; 1995; McGraw-Hill; 2nd Edition; chapter 1, p. 11.*

* cited by examiner

*Primary Examiner*—Stephone B Allen
*Assistant Examiner*—Christopher P Rivard
(74) *Attorney, Agent, or Firm*—David S. Safran; Roberts Mlotkowski Safran & Cole, P.C.

(57) ABSTRACT

An optical element with improved deflection of a laser light beam calls for combination of a pentaprism with one or more glass blocks or an afocal optical system. A rotational angle-dependent parallel offset of emerging beams is eliminated for the most part.

5 Claims, 7 Drawing Sheets

OPTICAL ELEMENT FOR IMPROVING LASER BEAM POSITION

BACKGROUND OF THE INVENTION

1. Field of the Invention

This invention relates to an optical element with corrective action for laser beams, as can be used, for example, in a measuring device.

2. Description of Related Art

An invention of the above mentioned type is known from Ohtomo et al. U.S. Pat. No. 6,253,457. In this patent, it is explained how the emergence of a laser beam can be kept parallel to the earth's surface, and for this purpose, an optical correction system is used in order to improve the desired result with respect to the beam direction emerging from a pentaprism.

SUMMARY OF THE INVENTION

It is primary object of this invention has a similar object to that of the Ohtomo et al. patent, but instead of correction of the beam direction, the present invention seeks to improve the exit site of a laser beam on a deflecting optical element, especially on an optical element which deflects at a right angle, so that variation depending on the laser beam incidence angle is minimized.

Thus, a particular object of the invention is to keep the exit site of a laser beam constant, for the most part, in an optical element acting as a pentaprism, regardless of the incidence direction of the laser beam onto such an optical element.

This object is achieved by a device in accordance with the invention, the basic idea of which is to mount an optical element in front of a conventional pentaprism, which element produces a rotary angle-dependent parallel offset which is so great that the angle-dependent offset inherent in the pentaprism is compensated.

This object can also be achieved via an embodiment in which an optical element is mounted in front of and behind a conventional pentaprism.

The invention is explained in greater detail below with reference to the accompanying the drawings.

DETAILED DESCRIPTION OF THE INVENTION

Figure 1:
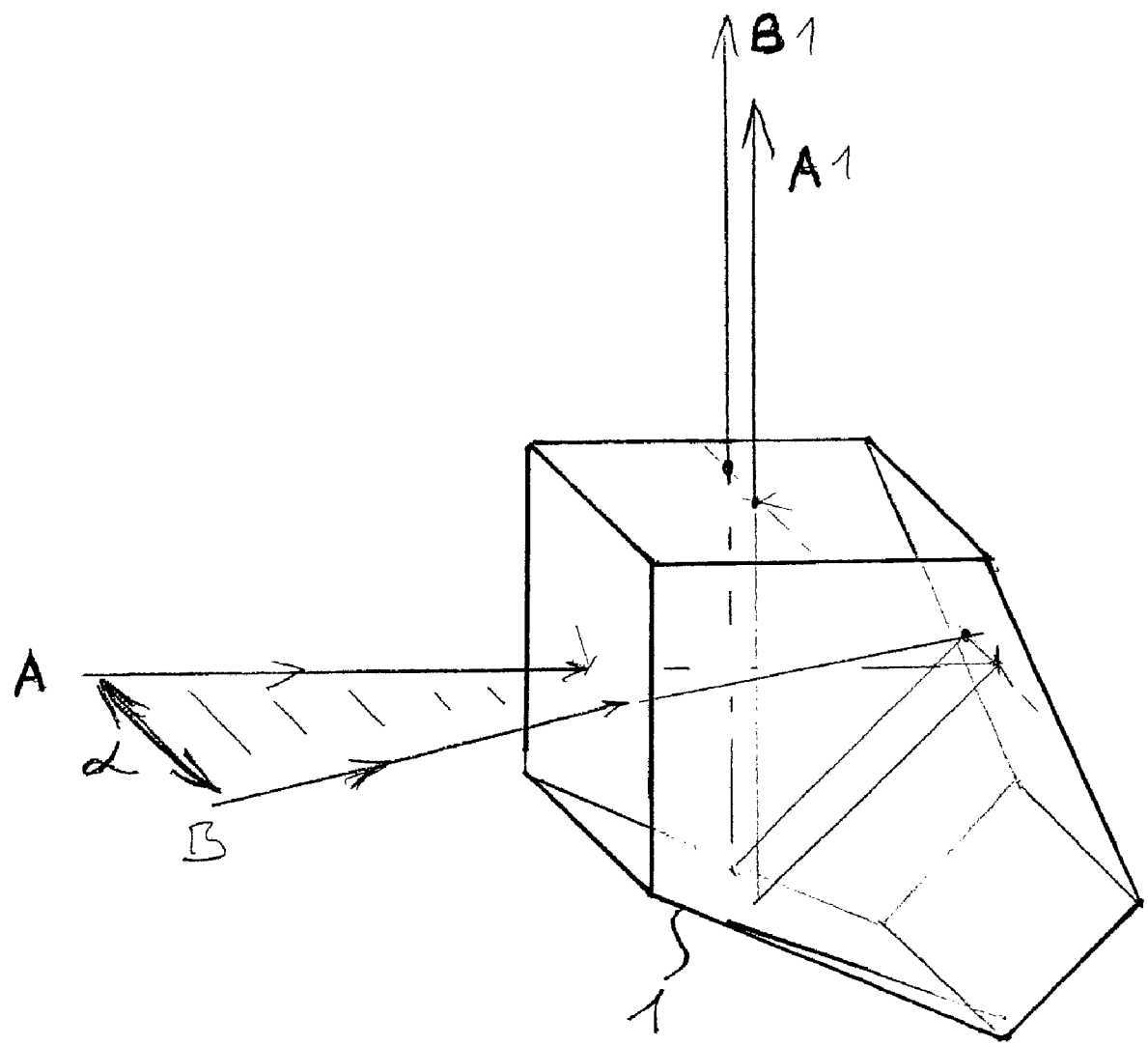
FIG. 1 is a perspective view of a known pentaprism.

As shown in FIG. 1, which reproduces the prior art, the following problem arises in a conventional pentaprism. A laser beam A, which is ideally incident perpendicularly, is deflected by 90° by the pentaprism and emerges as beam A1. If the pentaprism is turned by an angle "alpha" around an axis which coincides with the beam A1, the beam position of the incident beam B is changed relative to the pentaprism. Furthermore, although right-angle deflection for beam B takes place, there is an exit beam B1 which is offset relative to the beam A1 even if the beams A1 and B1 are parallel. However, in the invention, it is possible to keep the exit site of an emerging laser beam essentially constant in spite of rotation of the optical element through an angle of rotation. At the same time, the property remains preserved that entering and emerging laser beams are oriented at a right angle to one another.

Figure 2:
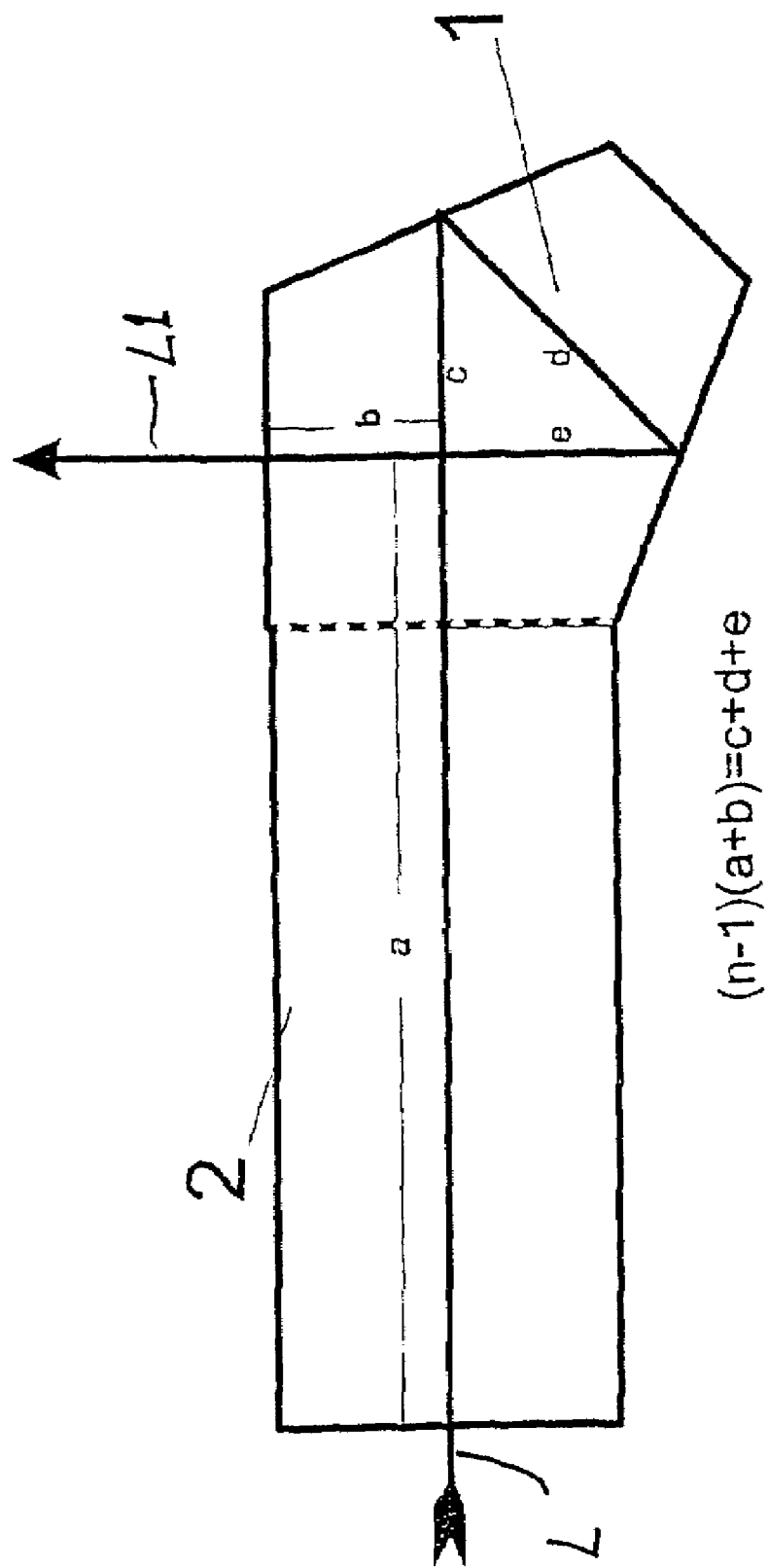
FIG. 2 shows a first approach in accordance with the invention.

FIG. 2 shows a first approach in accordance with the invention in which a pentaprism 1 is combined with a transparent, optical adapter block 2 which is provided with planar entry and exit surfaces. The adapter block 2 typically has a greater longitudinal dimension than the pentaprism 1, and as shown in FIG. 2, is in direct optical contact with the pentaprism 1 or is made as a one-piece arrangement together with it. The longitudinal dimension of the adapter block is computed and exactly stipulated using its optical density in order to obtain the desired correction result. According to the illustrated dimensions, the formula $(n-1)*(a+b)=c+d+e$ applies, where n is the index of refraction of the adapter block 2, a is the distance from the entry surface of the block 2 to a point of intersection between the paths of the incident light beam L and the emergent light beam L1, b is the distance between the path of the incident light beam L and an exit surface $1c$ of the pentaprism, c is the distance from a first surface $1a$ of the pentaprism 1 from which the incident light beam L is reflected to the point of intersection between the paths of the incident light beam L and the emergent light beam L1, d is the distance between the first surface $1a$ of the pentaprism and a second surface $1b$ of the pentaprism 1 from which the light beam reflected by said first surface $1a$ is reflected to the exit surface of the pentaprism as the emergent light beam a1, and e is the distance between second surface $1b$ and the path of the incident light beam L.

In this way, a device in accordance with the invention can be produced from optically transparent materials with almost any index of refraction n, especially those with an index of refraction of n=1.5 or from commercial types of glass.

Figure 3A:
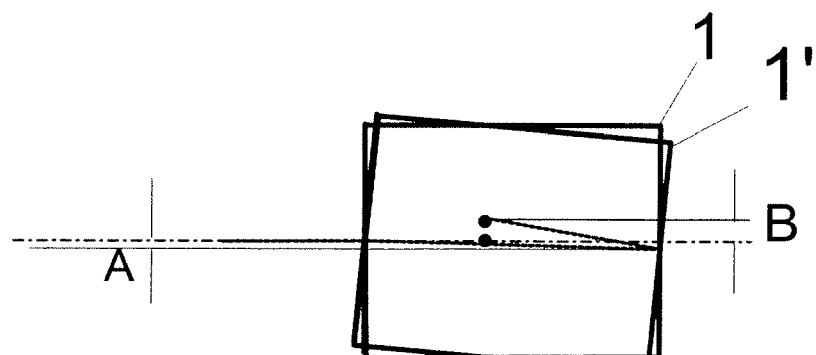
FIGS. 3A & 3b are, respectively, a top view of the pentaprism without an adapter block and top view of the arrangement shown in FIG. 2, in two angularly offset positions for explaining how refraction in the direction of the axis of incidence takes place by the adapter block for obliquely incident laser beams.
Figure 3B:
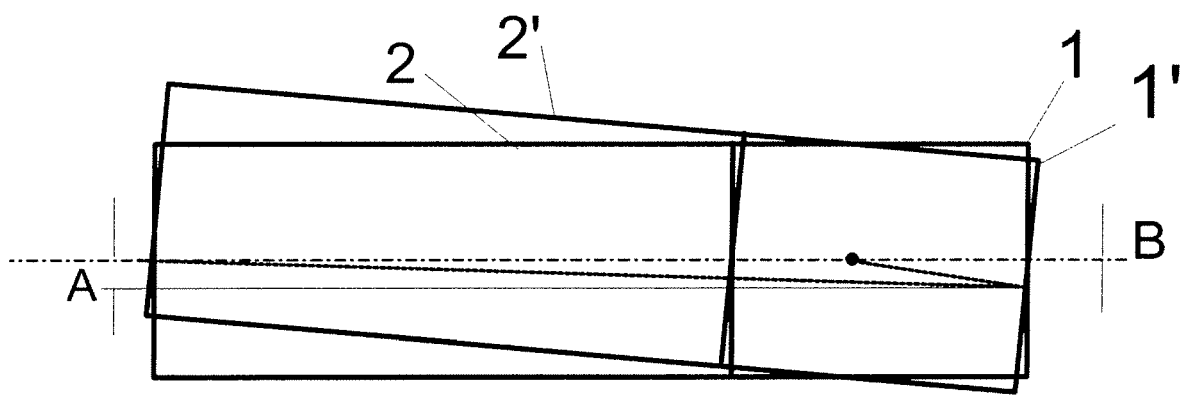

FIGS. 3A & 3B explain how refraction in the direction of the axis of incidence takes place by the adapter block for obliquely incident laser beams, and the length of the adapter block is selected such that regardless of the horizontal incidence angle, the location of beam emergence does not change. In particular, as is shown in FIG. 3A, if the pentaprism is turned by around an axis which coincides with the exit beam from position 1 to position 1', an offset A of the impinging beam produces an offset B in the position of the exiting beam, similar to the case described in connection with the prior art of FIG. 1. On the other hand, as can be seen from FIG. 3B, when the pentaprism with the adapter block 2 of the invention is similarly rotated, even with a larger offset A of the impinging beam, no appreciable offset B of the exit beam is produced. For perpendicularly oblique incident laser beams, this location essentially does not change either, although the entry and exit angles are at right angles to one another.

To achieve this desired effect, the length of the adapter block should be set so that the geometric length (a+b) should equal the virtual length of (a+b+c+d+e), which is ((a+b+c+d+e)/n), i.e. the sum of all geometrical light paths traveled in the block/prism combination divided by the refractive index n of the glass. For normal glass, n is approximately 1.52, which will result in the virtual length being shorter than the total distance (a+b+c+d+e). Thus, the formula:

$(a+b)=((a+b+c+d+e)/n)$ is used for the calculation of the size of the adapter block 2 on the incoming side of the pentaprism. The size of the adapter block 2 is the dimension to the left of the dashed line in FIG. 2, i.e. part of distance 'a'.

The idea represented by the equation in the preceding paragraph can also be viewed as requiring that the sum of all light paths traveled in the inventive device divided by the respective refractive indices of the materials through which the light is traveling must match the sum of (1) the geometrical lengths (i.e. measured on the outside of the glass block) of the beam path of the incident beam from the surface of entry into the device to the point of intersection between the path of the incident light beam and the path of the emergent light beam and (2) the beam path of the emergent beam from the point of intersection to the exit surface.

Figure 4A:
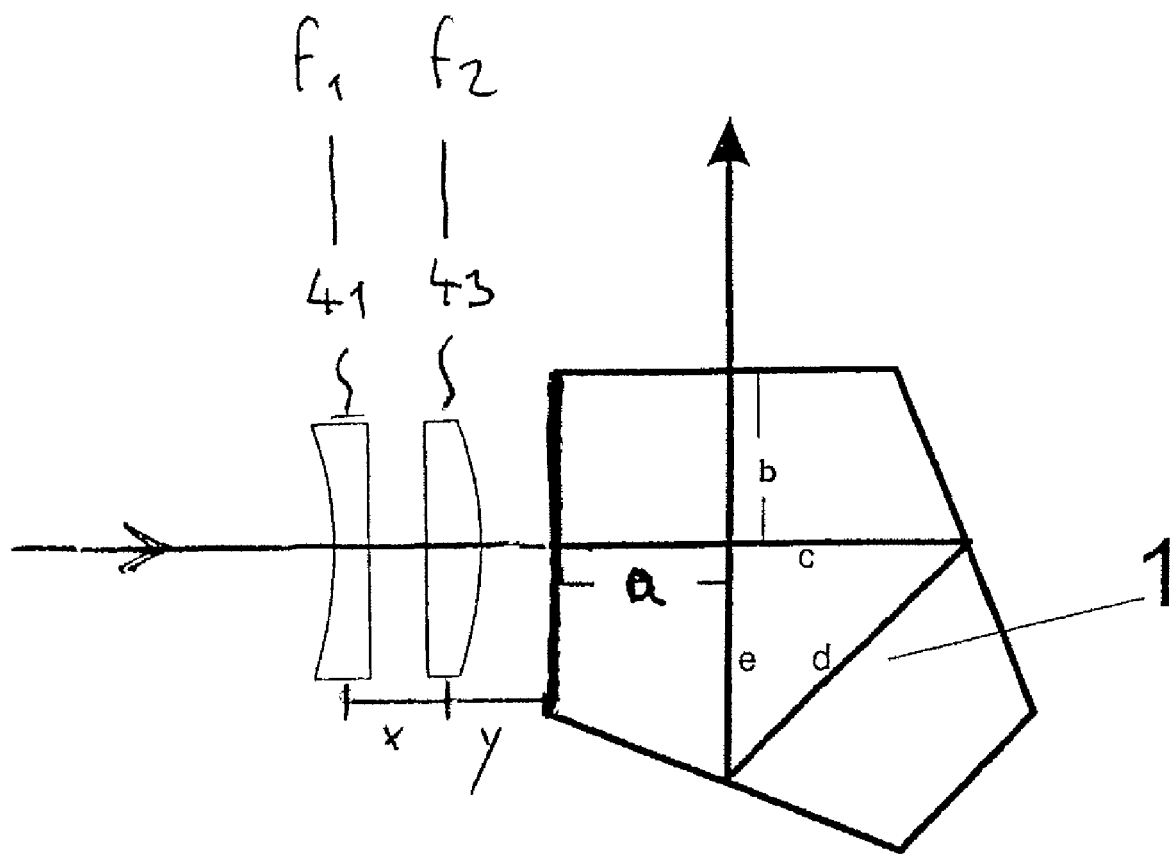
FIGS. 4A & 4B show two variations of another embodiment of the invention.
Figure 4:
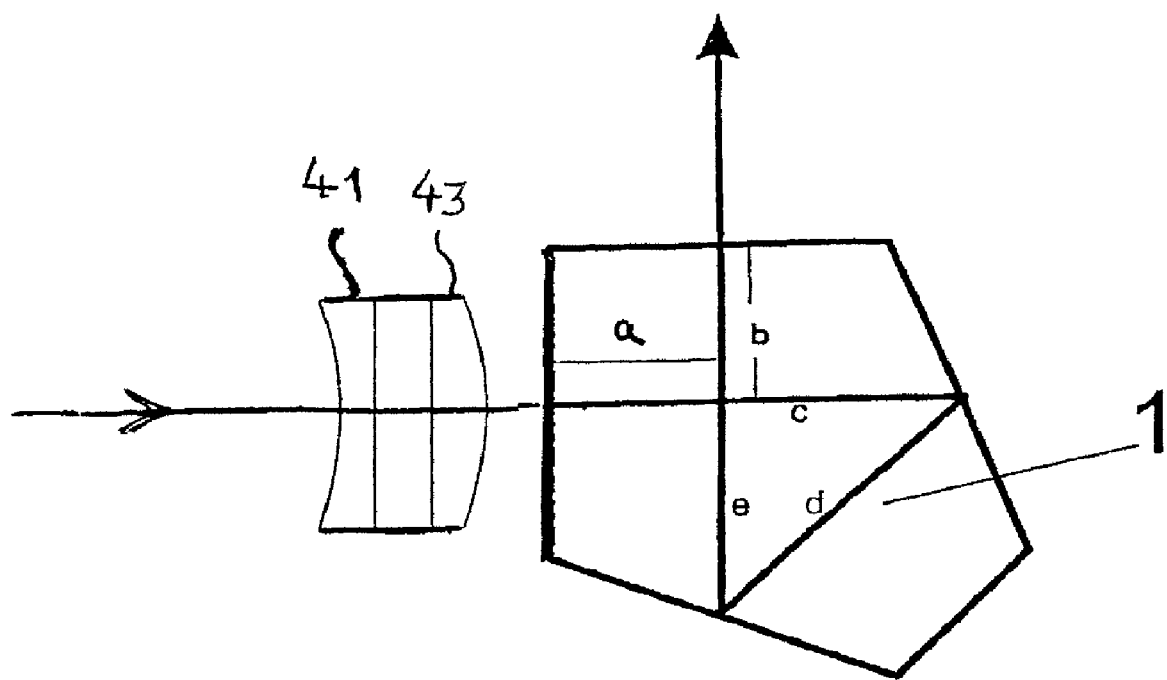

FIGS. 4A & 4B show another embodiment of the invention which enables welcome weight savings for an overall optical system in accordance with the invention and by which, at the same time, also advantageous shortening of the overall length can be achieved. The surfaces of the lens combination as shown in FIGS. 4A & 4B with the concave lens 41 and convex lens 43 are chosen such that an afocal optical system results. The difference between the two versions of these figures is that in FIG. 4A, the lenses 41, 43 are spaced apart with an air gap while in FIG. 4B the lenses 41, 43 are spaced apart by being joined to opposite sides of a transparent spacer block.

Figure 5:
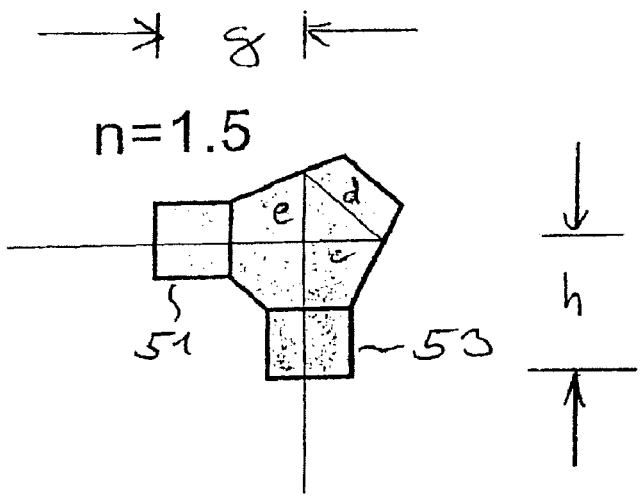
FIG. 5 is a view which shows how the required lengthening of the light path can be effected.
Figure 6:
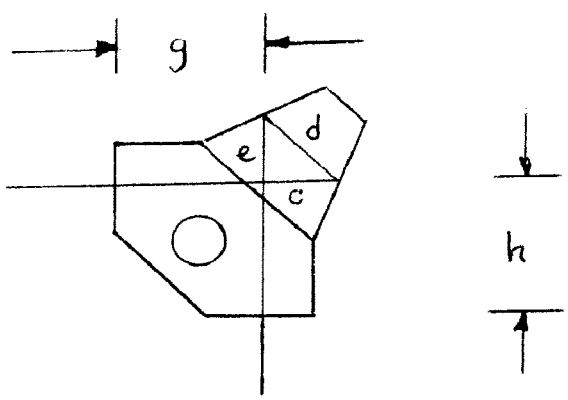
FIGS. 6-8 each show a respective further embodiment in accordance with the invention.

In turn, other embodiments are shown as examples in FIGS. 5 to 8, which allow for different indices of refraction for the different optical parts used. As indicated on the figures, for the embodiments of FIGS. 5-7, the relationship $(n-1)(g+h)=c+d+e$ applies. For an index of refraction of $n=1.5$, a cross section as shown in FIGS. 5 & 6 can be chosen. FIG. 5 shows how the required lengthening of the light path can be effected with two transparent blocks 51, 53; this leads to a more compact construction. A similar embodiment is shown in FIG. 6, which has the advantage that it can be produced in two pieces.

Figure 7:
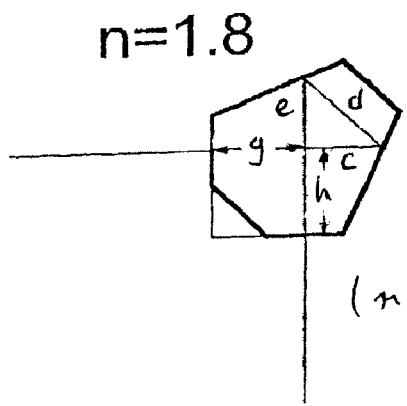
Figure 8:
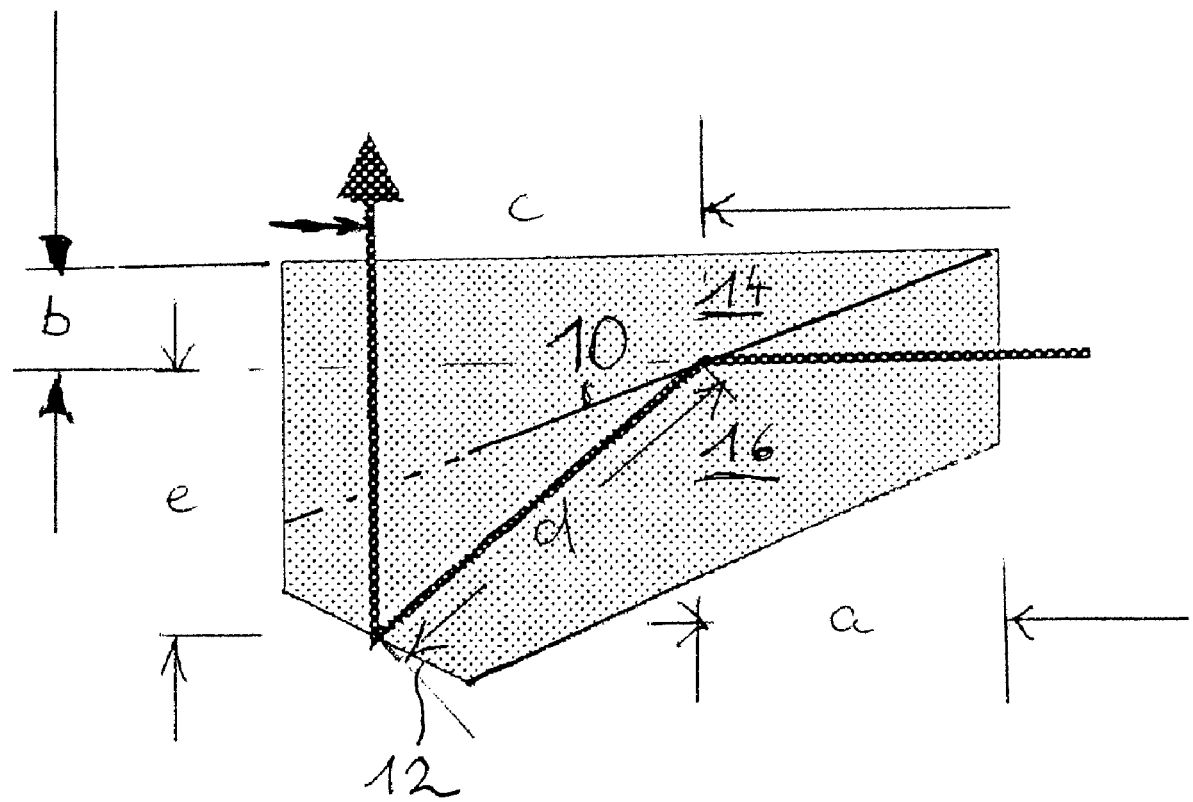

The cross section of an embodiment produced in one piece is shown in FIG. 7 which however assumes an index of refraction of roughly 1.8 of the optical material used Another, economically producible version is shown in cross section in FIG. 8. This embodiment is also produced from two individual prisms (14, 16) by cementing or puttying. The prism 16 is provided with a mirrored surface 12. The cement surface between the prisms 14 and 16 is mirrored over a partial area 10 so that a beam path as shown is enabled. This construction requires comparatively few optical surfaces which are relatively easy to grind. For the FIG. 8 embodiment, the relationship $(a+b+c)=(a+b+d+e)/n$ applies, where a is the distance from the entry surface to the point of reflection at area 10, b is the distance between the point of reflection at area 10 and the exit surface, c is the distance between the point of reflection at area 10 and the emergent light beam, d is the distance between the point of reflection at area 10 and the point on mirrored surface 12 from which the light beam is reflected at area 10 is reflected to the exit surface as the emergent light beam, and e is the distance between the point on mirrored surface 12 at which the light beam is reflected to the exit surface and the plane of the path of the incident light beam L, as represented in FIG. 8.

It is noted that, with the exception of the embodiment of FIG. 4A for which the air gap has to be taken into account, a general equation that can be considered to apply is:

$$\Sigma(x_i/n_i)=\Sigma y_j$$

where $\Sigma(x_i/n_i)$ is the sum of all of the path segments traveled by the beam inside of the optical element divided by the respective refractive index of the material through which each beam path segment travels, $x_i$ being the beam path segment, $n_i$ being the refractive index of the material through which path segment $x_i$ travels, and $y_j$ being the distances measured on the outside of the device from the surface at which the incident beam hits to the intersection point between the incident beam (or an extension thereof as in FIG. 8) and the emerging beam and from this intersection point to the exit surface.

The invention is especially suitable for measuring purposes on machine tools and is preferably used there.

What is claimed is:

1. Optical element for deflecting a light beam by 90°, with a correction means for improving the relative position of the incident and emergent light beams of a single light beam comprising a combination of a pentaprism with at least one transparent glass block which is permanently attached relative to it with a planar entry and exit surfaces, dimensions of the glass block being set relative to dimensions of the pentaprism at values which will produce a rotary angle-dependent parallel offset between a single light beam which is incident and emergent on the glass block that will essentially completely compensate for an inherent rotary angle-dependent parallel offset for light beams incident on directly the pentaprism, wherein the at least one transparent glass block has a length determined in accordance with the relationship $(a+b)=((a+b+c+d+e)/n)$, where n is the index of refraction of the at least one glass block, a is the distance from the entry surface to a point of intersection between the paths of the incident light beam and the emergent light beam, b is the distance from the exit surface to a point of intersection between the paths of the incident light beam and the emergent light beam, c is the distance from a first surface of the pentaprism from which the incident light beam is reflected to the point of intersection between the paths of the incident light beam and the emergent light beam, d is the distance between the first surface of the pentaprism and a second surface of said pentaprism from which the light beam reflected by said first surface is reflected to the exit surface of the pentaprism as the emergent light beam, and e is the distance between second surface and the exit surface of the pentaprism.

2. Optical element in accordance with claim 1, wherein the at least one glass block is connected directly to the pentaprism by putty or cement.

3. Optical element in accordance with claim 1, wherein the length of the at least one glass block has been selected as a function of its index of refraction.

4. Optical element for deflecting a light beam by a fixed angle, with a means for improving the relative position of the incident and emergent light beams of a single light beam, comprising a transparent prism with at least two mirrored surfaces, with a refractive index-dependent light path within the optical element, the length of the light path being set at a length by which a rotary angle-dependent parallel offset for the emergent light beam leaving the prism is substantially eliminated, and in which the relationship $$\Sigma(x_i/n_i)=\Sigma y_j$$

is satisfied, where $\Sigma(x_i/n_i)$ is the sum of all of the path segments traveled by the beam inside of the optical element divided by the respective refractive index of the material through which each beam path segment travels, $x_i$ being the beam path segment, $n_i$ being the refractive index of the material through which the respective beam path segment i travels, and $y_j$ being distances measured on the outside of the device from a surface of the optical element at which the incident beam hits to an intersection point between the incident beam or an extension thereof and the emerging beam, and from said intersection point and the exit surface.

5. Optical element for deflecting a light beam by 90° and for improving the relative position of the incident and emergent light beams of the single beam, comprising at least a pentaprism and transparent glass block arrangement and in which the relationship $$\Sigma(x_i/n_i)=\Sigma y_j$$

is satisfied, where $\Sigma(x_i/n_i)$ is the sum of all of the path segments traveled by the beam inside of the optical element divided by the respective refractive index of the material through which each beam path segment travels, $x_i$ being the beam path segment, $n_i$ being the refractive index of the material through which the respective beam path segment i travels, and $y_j$ being distances measured on the outside of the device from a surface of the optical element at which the incident beam hits to an intersection point between the incident beam or an extension thereof and the emerging beam, and from said intersection point and the exit surface.

* * * * *